US008804615B2

(12) United States Patent
Ramesh et al.

(10) Patent No.: US 8,804,615 B2
(45) Date of Patent: Aug. 12, 2014

(54) QUICK PAGING IN TELECOMMUNICATION SYSTEMS

(75) Inventors: Rajaram Ramesh, Raleigh, NC (US); Havish Koorapaty, Cary, NC (US); Kumar Balachandran, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 566 days.

(21) Appl. No.: 12/808,779

(22) PCT Filed: Dec. 18, 2008

(86) PCT No.: PCT/IB2008/003550
§ 371 (c)(1),
(2), (4) Date: Jun. 17, 2010

(87) PCT Pub. No.: WO2009/081263
PCT Pub. Date: Jul. 2, 2009

(65) Prior Publication Data
US 2010/0260112 A1   Oct. 14, 2010

Related U.S. Application Data

(60) Provisional application No. 61/014,471, filed on Dec. 18, 2007.

(51) Int. Cl.
*H04W 4/00* (2009.01)

(52) U.S. Cl.
USPC .................. 370/328; 370/329; 370/341

(58) Field of Classification Search
None
See application file for complete search history.

(56) References Cited

U.S. PATENT DOCUMENTS

| | | | | |
|---|---|---|---|---|
| 6,069,929 | A * | 5/2000 | Yabe et al. | 375/368 |
| 2005/0277429 | A1* | 12/2005 | Laroia et al. | 455/458 |
| 2006/0251098 | A1* | 11/2006 | Morioka | 370/432 |
| 2006/0285485 | A1* | 12/2006 | Agrawal et al. | 370/208 |
| 2007/0098096 | A1* | 5/2007 | Akita et al. | 375/260 |
| 2009/0143072 | A1* | 6/2009 | Montojo et al. | 455/450 |

* cited by examiner

*Primary Examiner* — Kevin C Harper
*Assistant Examiner* — Samina Choudhry

(57) ABSTRACT

In an orthogonal frequency division multiple access communication system, unused frequency resources during a conventional preamble signal are used for a quick paging mechanism. A set of quick paging signals is sent over the unused frequency resources to signal one or more subscriber stations.

25 Claims, 6 Drawing Sheets

FIG. 3
FIG. 4
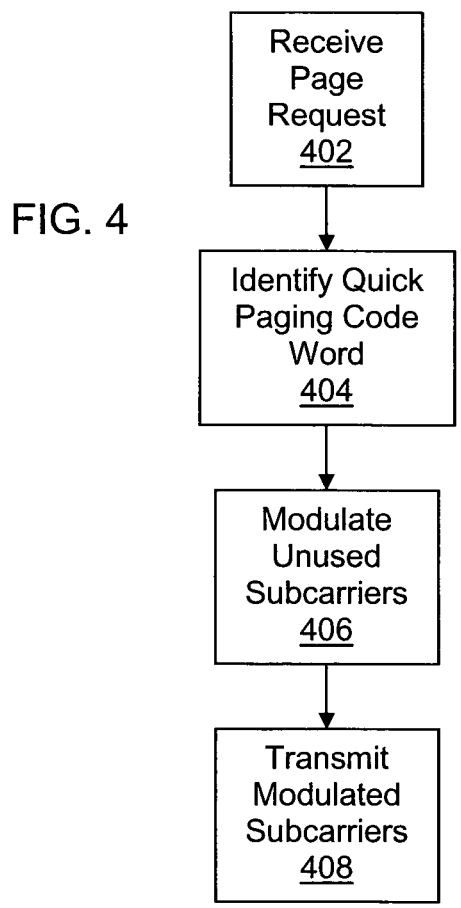

QUICK PAGING IN TELECOMMUNICATION SYSTEMS

This application claims the benefit of the filing date of U.S. Provisional Patent Application No. 61/014,471 filed on Dec. 18, 2007, which is incorporated here by reference.

TECHNICAL FIELD

This invention relates to radio communication systems and more particularly to paging in such systems.

BACKGROUND

The Institute of Electrical and Electronic Engineers (IEEE) 802.16 Working Group on Broadband Wireless Access Standards is specifying standards for broadband radio communication systems in wireless metropolitan area networks. The IEEE 802.16 family of specifications is called the Wireless Metropolitan Area Network (WirelessMAN) standard and has been dubbed "WiMAX", which is short for Worldwide Interoperability for Microwave Access, by an industry group called the WiMAX Forum. The mission of the WiMAX Forum is to promote and certify compatibility and interoperability of products complying with the IEEE 802.16 specifications.

The WirelessMAN standard defines aspects of the air interface between a radio transmitter and a radio receiver, including the physical (PHY) layer, and the Medium Access Control (MAC) layer. The WiMAX Forum has defined an architecture for connecting a WiMAX network with other networks, such as networks complying with IEEE 802.11 and cellular networks, and a variety of other aspects of operating a WiMAX network, including address allocation, authentication, etc. FIGS. 1A, 1B show examples of WiMAX networks, and it should be understood that the arrangement of functionalities depicted in FIGS. 1A, 1B can be modified in WiMAX and other communication systems.

As depicted in FIG. 1A, the network 100A includes base stations (BSs) 102, 104, 106, 108 that respectively transmit and receive radio signals in geographic areas called "cells", which typically overlap to some extent as shown. Subscriber stations (SSs) 110, 112 are located in the cells and exchange radio signals with the BSs according to the WiMAX air interface standard. An SS is typically either a mobile SS (MS) or a fixed SS, and it will be understood that a network can include many cells and many SSs. In FIG. 1A, the BSs communicate with and are controlled by Access Service Network (ASN) Gateways (G/Ws) 114, 116 that also communicate with each other, and with other core network nodes and communication networks (not shown), such as the public switched telephone network and the internet. SSs, such as SSs 110, 112, can be organized into groups for paging, as described in more detail below.

FIG. 1B depicts a WiMAX network 100B that also includes BSs 102, 104, 106, 108 and SSs 110, 112 as in the network 100A. The network 100B is more decentralized than the network 100A in that, in FIG. 1B, the BSs communicate with each other directly through a suitable routing network 118 that also communicates with other core network nodes and communication networks (not shown).

According to one mode of IEEE 802.16, the downlink (DL) radio signals transmitted by the BSs are orthogonal frequency division multiple access (OFDMA) signals. In an OFDMA communication system, a data stream to be transmitted by a BS to a SS is portioned among a number of narrowband subcarriers, or tones, that are transmitted in parallel. Different groups of subcarriers can be used at different times for different SSs. Because each subcarrier is narrowband, each subcarrier experiences mainly flat fading, which makes it easier for a SS to demodulate each subcarrier.

The DL radio signals and uplink (UL) radio signals transmitted by the SSs are organized as successions of OFDMA frames, which are depicted in FIGS. 2A, 2B according to a time-division duplex (TDD) arrangement in the IEEE 802.16e standard. FIG. 2B is a magnification of FIG. 2A and shows the format of the DL and UL subframes in more detail than in FIG. 2A. In FIGS. 2A, 2B, time, i.e., OFDMA symbol number, is shown in the horizontal direction and subchannel logical number, i.e., OFDM subcarrier frequency, is indicated by the vertical direction. FIG. 2B shows one complete frame and a portion of a succeeding frame, with each DL subframe including sixteen symbols and each UL subframe including ten symbols, not counting guard symbols.

Each DL frame 200 starts with a preamble signal that includes a known binary signal sent on every third OFDM tone or subcarrier, as depicted by FIG. 3. The range of subcarriers shown in FIG. 3 is numbered 0, 3, 6, . . . , 1701, but as explained below, a preamble can use fewer than that many subcarriers.

As seen in FIGS. 2A, 2B, each frame's preamble is followed by a DL transmission period and then an UL transmission period. According to the standard, the preamble signal is sent in the first OFDM symbol of a frame, which is identified by an index k in FIG. 2B, and is defined by the segment, i.e., one of the three sets of tones to be used, and a parameter IDCell, which is the transmitting cell's identification (ID) information. A SS uses the preamble for initial synchronization of its receiver to the BS (the network), and to determine the location of a frame control header (FCH), which is among the first bursts appearing in the DL portion of a frame. A SS also uses the preambles in signals transmitted by neighboring BSs to synchronize to them for purposes of measurement for handover from one cell to another.

The FCH gives information on the DL signal parameters, including a DL map message (DL-MAP), which is a medium access control (MAC) message that defines DL allocations for data, and parameters relevant for reception of the signal. The DL-MAP may be followed by an UL map message (UL-MAP), which provides UL allocations for data, and other parameters relevant for transmission of signals from an identified SS. With the assignments in time and frequency from the DL-MAP, an identified SS can receive the data in the particular location. Similarly, it can identify assignments in time and frequency on the UL-MAP, and transmit accordingly. FIGS. 2A, 2B also show a transmit/receive transition gap (TTG) interval and a receive/transmit transition gap (RTG) interval, which are used by the BS and SS to switch from transmit to receive and vice versa.

FIG. 2A also illustrates how a BS pages an SS operating in idle mode, showing the relationship between paging cycles, paging offset, BS paging interval, and OFDMA frames. Only two of the succession of paging cycles are shown in FIG. 2A. An SS "listens" for a page message from the BS during only a portion of a paging cycle, and the location of that paging interval is determined by a paging offset from the start of the paging cycle. A paging message can span several OFDMA frames, which the SS needs to demodulate to read the entire message.

Thus, while a SS is idle, the SS periodically turns on its baseband unit, which includes a fast Fourier transform (FFT) demodulator and decoder, even when there are no paging messages for it and no system configuration changes/updates. The SS first synchronizes with the preamble and reads the FCH, and it then reads the DL-MAP to look for the location and the format of a broadcast connection identifier (CID). If the DL-MAP shows a broadcast CID, the SS demodulates that burst to determine whether there is a BS broadcast paging message (MOB_PAG-ADV).

Most of the time, there is no paging message and no action required by the SS, but during each paging interval, an SS has to be fully "awake", which is to say, its receiver has to be powered up, for a number of OFDMA frames, using electrical power and possibly draining a battery over time. For a BS, periodically sending MOB_PAG-ADV messages that require no action also wastes downlink capacity. In addition to MOB_PAG-ADV messages, changes in channel descriptors or broadcast system updates can trigger an idle SS to stay on for updating the system parameters or reading other coming messages.

A "quick" paging mechanism that can reduce the negative effects of the conventional paging mechanism is desirable for current and future versions of the WiMAX standards. In such a quick paging mechanism, a simple signal would indicate to a group of SSs that a paging signal exists in a subsequently transmitted signal block.

A new standard for mobile broadband communication is under development as IEEE 802.16m, which is required to be backward-compatible with products complying with the current WiMAX standards and at the same time should improve performance considerably compared to current WiMAX technology. In developing IEEE 802.16m, a proposal has been made for a quick paging mechanism that is described in IEEE C802.16m07/217, "Wake-up Signal for 802.16m OFDMA Idle Mode" (Nov. 7, 2007). If an SS decodes the quick paging signal correctly, the SS needs to listen to the conventional paging signal; otherwise, the SS can go back to "sleep", thereby saving its resources, such as battery power.

In cellular telephone networks using code division multiple access (CDMA), such as CDMA2000 and wideband CDMA (WCDMA) networks, paging groups are predefined by the applicable standards based on mobile station IDs. Similarly, a mapping between quick paging messages and mobile station IDs is also predefined. The architecture is centralized, and so a central node passes registration information about a mobile station to multiple cells in a paging area. Thus, a mobile station can be reached in any cell belonging to the assigned paging area using a quick paging message. Additionally, the mobile station informs the network whenever it enters a new cell that belongs to a different paging area, triggering defined paging area updating procedures.

A quick paging mechanism is not specified in current versions of the WiMAX standards, and thus far, proposals for quick paging, such as IEEE C802.16m07/217, either steal system resources from the system's available resources, thereby reducing system capacity, or occupy transmit and receive gaps in a time-division duplex (TDD) version of the system, which could lead to issues of compatibility among different device implementations.

SUMMARY

Unused frequency resources during a conventional preamble signal are used for a quick paging mechanism. A set of quick paging signals is sent over the unused frequency resources to signal one or more subscriber stations.

In accordance with aspects of this invention, there is provided a method of quick paging in a communication system using a plurality of subcarriers for orthogonal frequency division multiple access, at least one predetermined preamble sequence being successively transmitted on a predetermined first set of the subcarriers. The method includes transmitting at least one quick paging code word on a second set of subcarriers. The second set includes only subcarriers that do not carry a preamble sequence, and the quick paging code word and the preamble sequence are transmitted simultaneously.

Also in accordance with aspects of this invention, there is provided a method in a subscriber station of quick paging in a communication system using a plurality of subcarriers for orthogonal frequency division multiple access. The method includes receiving a signal that can include at least one predetermined quick paging code words carried by a set of subcarriers, and determining whether a respective quick paging code word is present in the received signal. The set of subcarriers is different from a set of subcarriers that carry a predetermined preamble signal.

BRIEF DESCRIPTION OF THE DRAWINGS

The several features, objects, and advantages of this invention will be understood by reading this description in conjunction with the drawings, in which:

FIG. 3 depicts an arrangement of subcarriers for preamble signals;

FIG. 4 is a flow chart of a method of quick paging;

DETAILED DESCRIPTION

This description focuses on a radio communication system according to the WiMAX standards, but the artisan will understand that the invention in general covers other wireless communication systems.

Figure 1A:
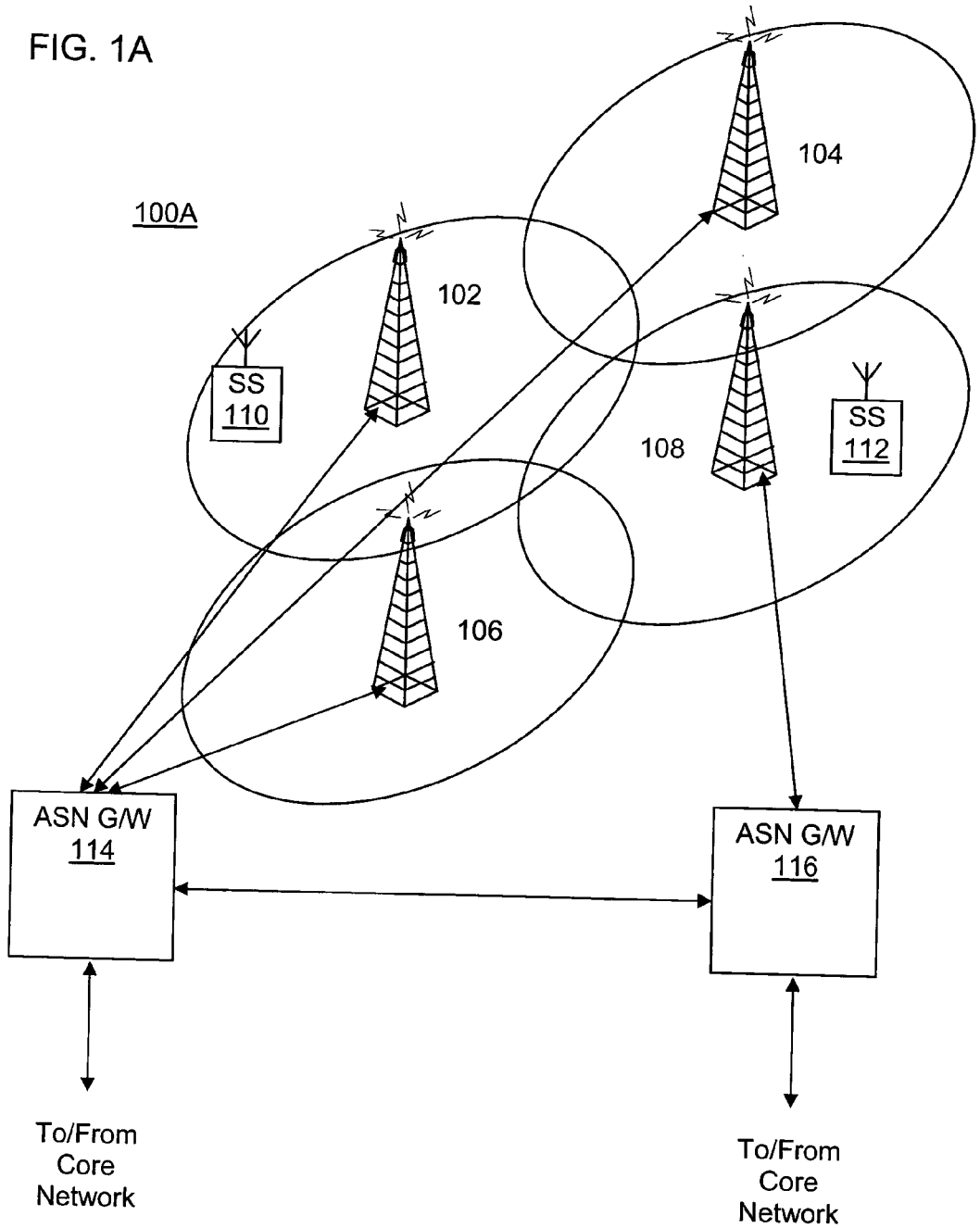
FIG. 1A, 1B depict examples of telecommunication networks.
Figure 1B:
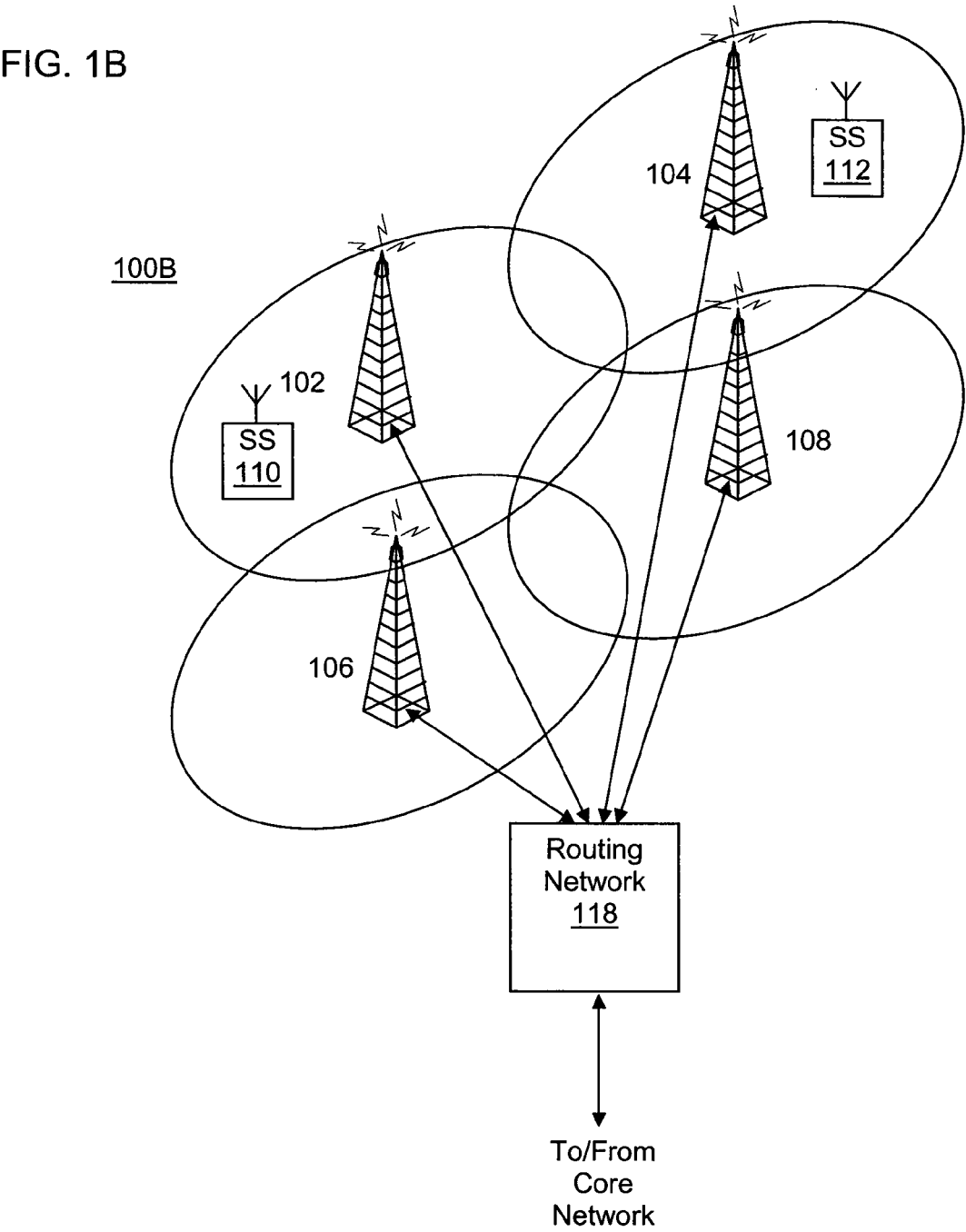
Figure 2A:
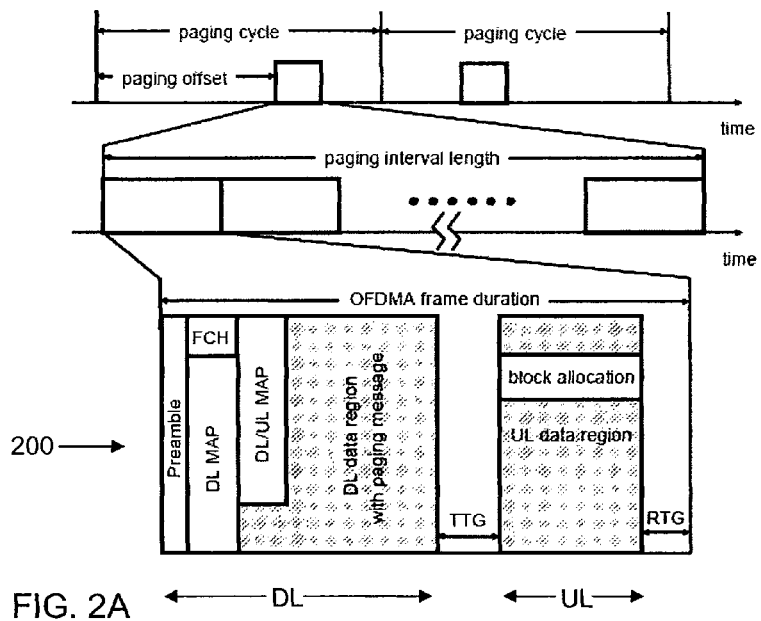
FIGS. 2A, 2B depict downlink and uplink signals organized as successions of frames.
Figure 2B:
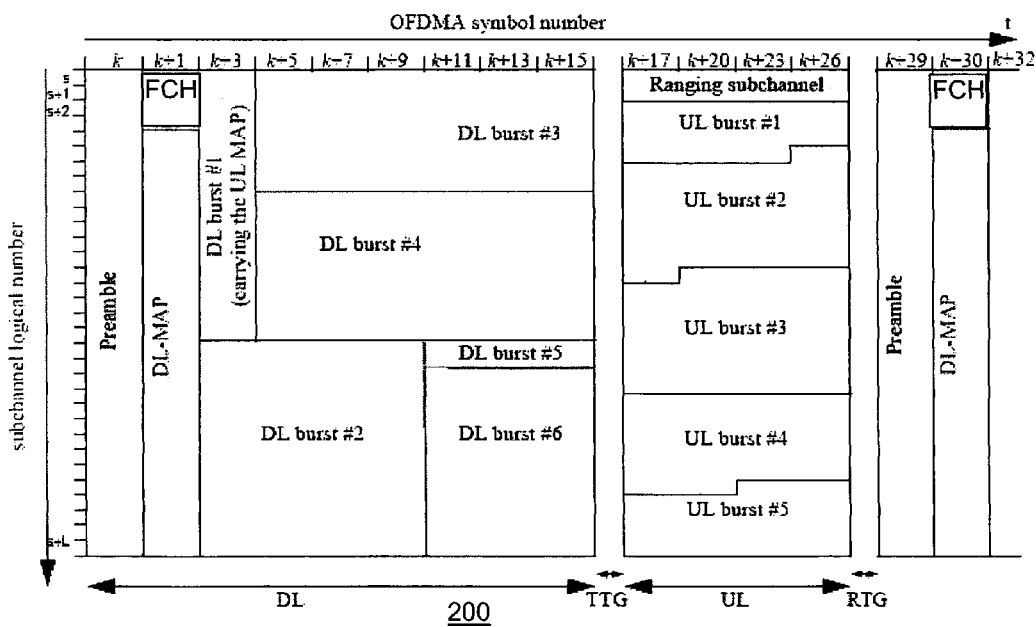

Section 8.4.6.1.1 of IEEE 802.16e-2005 defines the DL preamble, the position of which can be seen in the format depicted in FIGS. 2A, 2B, as one of three sets of subcarriers that are modulated by defined pseudo-random noise (PN) sequences using boosted binary phase shift keying (BPSK) modulation. For convenience of explanation below, the defined PN sequences, examples of which are listed in Tables 309, 309a, 309b, and 309c of IEEE 802.16e-2005, are called "preamble sequences" in this application. Other communication systems can use defined sequences equivalent to those defined in IEEE 802.16e-2005, and such sequences and sequences that may be defined by future developments of IEEE 802.16e-2005 are also "preamble sequences" for this application. A BS selects preamble sequences from the set of defined sequences for its use in its DL preambles.

Among other things, the inventors have recognized that unused subcarriers (i.e., unused system resources) during a DL preamble signal can be used for a quick paging mechanism. Referring to the conventional preamble subcarriers depicted in FIG. 3, such unused subcarriers would be numbered 1, 2, 4, 5, 7, 8, . . . , 1696, 1697, 1699, 1700, 1702, 1703, and a group of such unused subcarriers is used for a quick paging signal. A set of quick paging code words similar to the conventional DL preamble sequences can be defined and sent over the unused resources to signal one or more SSs.

As a first example of such a quick paging mechanism, a BS can employ as quick paging signals one or more preamble sequences that are either (1) unused in the network or (2) used by BSs that are physically distant from the transmitting BS so that there is no more than a low probability that a receiver listening to the transmitting BS could also hear those physically distant BSs. The BS can use a set, e.g., eight, of such otherwise-unused preamble sequences as quick paging code words to signal SSs that are suitably organized into a corresponding set, e.g., eight, of different quick paging groups (PGs). Receipt of a particular quick paging code word by a SS indicates to the SS the presence of a conventional paging signal or other information in subsequent blocks or subframes.

FIG. 4 is a flow chart of method of quick paging that can be implemented by a suitably configured BS, for example by a suitably programmed digital signal processor in the BS. In step 402, the BS receives a conventional request from a core network node to page one or more SSs believed to be located in a paging area that includes the BS. In step 404, the BS identifies a quick paging code word, such as an unused preamble sequence, that corresponds to the SS or SSs to be paged. In step 406, the BS modulates a number of subcarriers that are not used for the conventional preamble signal with the identified quick paging code word, advantageously using boosted BPSK. The number of subcarriers corresponds to the length of the quick paging code word. In step 408, the BS transmits the subcarriers that are modulated with the quick paging code word.

As described above, the sequence, or code word, used for quick paging is sent over a group of subcarriers that is not used for the conventional preamble of a DL subframe, i.e., a group of subcarriers other than the group of every third subcarrier, which carries the conventional preamble. With reference to the conventional preamble subcarriers depicted in FIG. 3, such a group of unused subcarriers could include subcarriers numbered 1, 4, 7, . . . , 1696, 1699, 1702. The quick paging sequence is also preferably sent at the same time as the conventional preamble, i.e., during OFDM symbol k seen in FIG. 2B, in order to avoid altering the temporal length of a conventional DL subframe. In addition, this enables a SS to receive only the OFDM symbol containing the preamble signal, from which it has sufficient information to decode the quick paging signal, from which it can determine whether to "wake up" in a subsequent frame to receive a full paging signal or go back into a "sleep" mode. The quick paging code word can be transmitted by a BS at a much lower power level than the normal preamble sequence mainly because the SSs need to decode only information related to presence/absence of subsequent normal paging signals. Thus in principle, a quick paging code word, which can be more than 100 bits (subcarriers) long, carries one bit of information, i.e., the presence/absence of a subsequent conventional paging signal. In general, the number of bits that can be carried by the quick paging signal is the $\log_2$ of the number of code words used.

As another example of the quick paging method just described, two additional otherwise-unused preamble sequences can be used by a BS in addition to the set of quick paging code words for respective PGs. One of the additional preamble sequences can be used to signal the presence of a paging signal to all PGs, and the other additional code word can be used to signal the absence of a paging signal to all PGs.

As yet another example, rather than use just one otherwise-unused preamble sequence as a quick paging code word, more processing gain can be obtained by using a combination of two (or even more) otherwise-unused preamble sequences as a quick paging "code word". A BS can transmit each combination of otherwise-unused preamble sequences over a third set of the subcarriers that are not used for a conventional preamble. Furthermore, two additional such combinations can be used to indicate either the presence or absence of a conventional paging signal to all PGs. Consider a typical WiMAX channel that has a width of ten megahertz (10 MHz). A conventional preamble sequence of length 284 bits is modulated onto 284 subcarriers, leaving 568 subcarriers unused and thus available for carrying one or more quick paging code words, e.g., as many as two unused preamble sequences.

The inventors have also recognized that instead of otherwise-unused preamble sequences, other sequences can be used as quick paging code words. In particular, a quick paging sequence can be longer than a conventional preamble sequence, e.g., as long as two such preamble sequences as described above. Such quick paging sequences can still be sent over unused subcarriers in symbol positions in which normal preambles are sent, but since they are longer and are sent over more subcarriers, the power allocated to them can be lower.

In a 10-MHz-wide WiMAX channel, an example of a suitable quick paging code word is a length-512 Walsh-Hadamard (W-H) sequence, which can be carried by only 512 of the unused 568 subcarriers. The set of length-512 W-H code words includes 512 orthogonal code words, which can be masked by a cell-specific PN sequence in order to prevent spectral irregularities. Masking a W-H code word with a PN sequence can be done by combining according to a logical exclusive-OR function, which is easy to implement with a logic gate or suitable programming. Different PN sequences can be used in respective cells in a network.

For a 5-MHz-wide WiMAX channel, the preamble sequence occupies 143 subcarriers, leaving 286 unused subcarriers available for carrying a quick paging code word. In such a channel, length-256 W-H sequences are suitable as quick paging code words. Other channel bandwidths, such as 8.75 MHz, can be accommodated in a similar manner. It is currently believed that it is not necessary for the quick paging code words to be mutually orthogonal or bi-orthogonal sequences, as W-H sequences and their inverses and many other kinds of sequences are, although orthogonality is a common feature of sequences used in telecommunication systems that improves detectability at low signal-to-noise ratios.

Rather than indicate the presence or absence of a conventional paging signal by the presence of absence of a quick paging code word, a BS can assign two quick paging code words, such as length-512 W-H code words, to each PG such that transmitting one of the two assigned code words indicates the presence of a paging signal on a subsequent frame or subframe, and transmitting the other of the two assigned code words indicates the absence of a paging signal on a subsequent frame or subframe.

With aggregation of signal energy over 512 subcarriers, it is currently believed reasonable to expect that the transmitted power level of the quick paging signal can be as much as 512 times (or about 27 dB) lower than the transmitted power level of the conventional DL signals. Even with a power boost of around 3 dB (amounting to a processing gain of 24 dB) over normal DL signals, the quick paging signals are expected to cause very little interference to other cells, and have negligible impact on cell selection, reselection, and handover measurements, which are done partly by using measurements on preamble signals.

Figure 5:
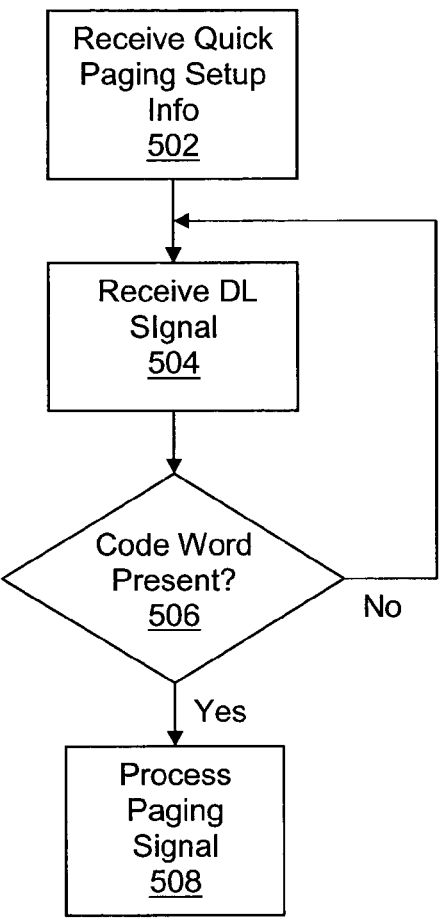
FIG. 5 depicts a method of quick paging that is implemented at a subscriber station.

FIG. 5 depicts a method of quick paging that is implemented at an SS. In step 502, the SS receives quick paging setup information from a BS. The setup information is transmitted by the BS and informs the SS of the quick paging code word(s) that the SS should listen for. For example, the setup information can include the SS's corresponding code words or suitable identifiers of those code words, and identifiers of the subcarriers used for quick paging. The BS can include the setup information as one or more information elements in the messages typically sent by the BS to the SS during confirmation of the SS's cell registration. In step 504, the SS receives another DL frame or subframe, and in step 506, the SS determines, based on the quick paging setup information, whether its respective quick paging code word is present in a DL frame or subframe. If the SS's quick paging code word is not present (No in step 506), the process flow returns, and so the SS can go back to "sleep" or carry out other procedures. If the quick paging code word is present (Yes in step 506), the SS processes a subsequent conventional paging or other DL signal, staying "awake" if necessary to do so. Of course, if a quick paging code word is used to indicate that no paging or other DL information is coming, then the SS can "process" the signal by going back to "sleep".

A SS can determine whether its quick paging code word is present in any of several ways. For example, the SS can simply correlate the signal it receives over the quick paging subcarriers with local copies of its respective code words that are stored in a suitable memory or carry out a fast Walsh transform and compare the transform result to stored results corresponding to its respective code words when the quick paging code words are W-H sequences. Alternatively, a SS can process its received signal further and decode the received signal based on estimates of the characteristics of the channel. The channel estimates used for such decoding can be computed in a conventional way based on the received preamble signal. In either example, the SS typically computes correlation metrics for the quick paging code words corresponding to its PG, and determines which quick paging code word was transmitted based on the difference between the metrics.

In an embodiment in which each quick paging code word corresponds to a respective one of the PGs, a SS attempts to detect in its received signal the presence of the quick paging code word assigned to its PG to determine whether there is a subsequent paging message for the SS. The SS can determine whether its assigned quick paging code word is present by determining the code word that it has received best (i.e., the code word having the best metric) among all possible code words that can be transmitted.

As described above, a SS's quick paging code word can be sent over 512 of the 568 subcarriers unused by a conventional preamble in a 10-MHz-wide channel. To improve the accuracy of the presence determination, a BS can send pilot symbols having known symbol values over the remaining 56 unused subcarriers. The pilot symbols can be used by the SS to estimate further channel parameters in order to improve reception. It will be understood that quick paging code words of other lengths and other numbers of pilot symbols can also be used. It will be appreciated that channel estimates can also be obtained based on the preamble signal that is already present. The additional pilot symbols can be used to refine the channel estimates.

A conventional paging signal or other information that a BS wants a SS to hear is typically sent on a frame subsequent to the frame in which the quick paging signal is received. This enables the SS to receive just the quick paging signal in the earlier frame, over only the duration of the symbol where the preamble is present, and then shut off its receiver. Based on that earlier frame, the SS determines whether it needs to be "awake" to receive a paging signal, and if so, the SS can receives the entire DL subframe of the succeeding frame to check for a paging signal assigned to it. Since it is more likely that a SS does not receive a paging signal than that the SS does receive one, this arrangement can increase the SS's battery life.

Figure 6:
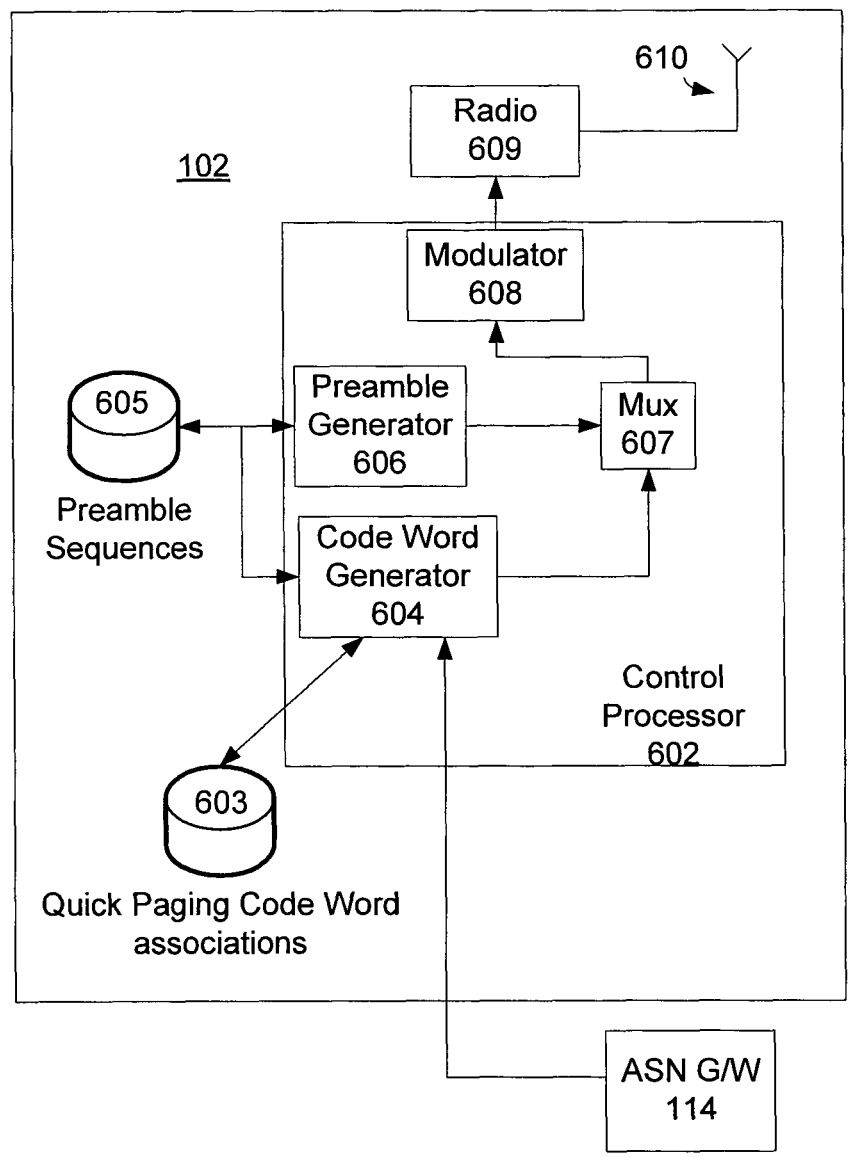
FIG. 6 is a block diagram of a transmitting node in a telecommunication network.

FIG. 6 is a block diagram of a portion of the BS 102, which is typical of other BSs 104, 106, 108 and such transmitting nodes or stations in a WiMAX OFDMA network 100, that can transmit the quick paging setup information and code words for the methods described above. It will be appreciated that the functional blocks depicted in FIG. 6 can be combined and re-arranged in a variety of equivalent ways, and that many of the functions can be performed by one or more suitably programmed digital signal processors and other known electronic circuits.

The BS 102 is operated by a control processor 602, which typically and advantageously is a suitably programmed digital signal processor. The control processor 602 typically provides and receives control and other signals from various devices in the BS 102. For simplicity in FIG. 6, the control processor 602 is shown exchanging information with a suitable memory 603, which is a repository of associations between quick paging code words and SSs and other information useful for sorting one or more SSs into paging groups as described above.

Such information is provided to a quick paging code word generator 604, which uses the information to generate quick paging setup information for transmission to SSs in communication with the BS 102 as described above. The code word generator 604 also generates selected quick paging code words for transmission to one or more SSs and paging groups as described above. For that purpose, the generator 604 can produce suitable code word sequences, such as W-H sequences, or retrieve unused conventional preamble sequences from a preamble sequence memory 605. The quick paging code word generator 604 can also be configured to mask the selected quick paging code words by combining those code words with a PN sequence.

It will be understood that although the generator 604 is depicted in FIG. 6 as part of the control processor 602, this is not necessary; the generator 604 as well as one or more other devices depicted as part of the processor 602 can be implemented by dedicated programmed processors or other suitable logic configured to perform their functions. For example as described above, the control processor 602 can be readily configured to generate pilot symbols having known symbol values to be sent over a set of subcarriers that does not include subcarriers that carry either the conventional preamble or the quick paging code word(s).

A preamble generator 606 also retrieves stored conventional preamble sequences from the memory 605 that are then used for producing the conventional preamble portion of the DL signal transmitted by the BS 102.

The code word generator 604 provides the setup information and/or the selected quick paging code words to a multiplexer 607, which also receives the conventional preamble generated by the generator 606. The multiplexer 607 combines the setup information or code words with the preamble and other data in a DL frame or subframe to be transmitted. The combined information stream produced by the multiplexer 607 is converted by a suitable OFDM modulator 608 into modulation symbols that are provided to an OFDM radio transmitter 609, which impresses the modulation symbols on suitable subcarrier signals. The modulated subcarrier signals are transmitted through a suitable antenna 610.

As described above, the BS 102 is responsive to a request by the network to reach a SS or group of SSs by transmitting the quick paging code word(s) associated with the SS(s). In FIG. 6, such a request is shown as provided through an ASN gateway 114 to control processor 602 and generator 604. In response to the request, the generator 604 retrieves the code word(s) or code word ID(s) associated with the desired SS(s) from the memory 603, and generates the appropriate quick paging signal for transmission by the BS 102.

Figure 7:
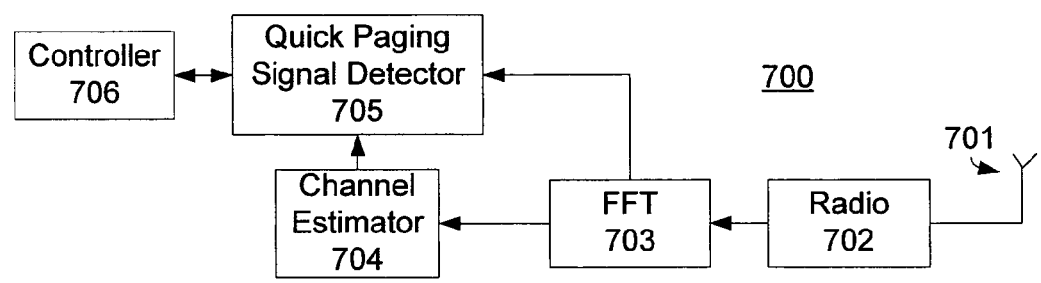
FIG. 7 is a block diagram of a subscriber station.

FIG. 7 is a block diagram of a portion of a receiving node 700, such as a SS in a WiMAX OFDMA network 100, that can receive the quick paging setup information and code words for the methods described above. It will be appreciated that the functional blocks depicted in FIG. 7 can be combined and re-arranged in a variety of equivalent ways, and that many of the functions can be performed by one or more suitably programmed digital signal processors and other known electronic circuits.

The receiving node 700 includes a suitable antenna 701 for receiving DL signals transmitted by BSs. The received signals are provided to a suitable OFDM radio receiver 702 that spectrally translates the received signals to a more convenient portion of the spectrum, e.g., base band. The signal produced by the radio 702 is demodulated by a suitable processor 703 for OFDM demodulation, such as an FFT, and the processor 703 communicates with a channel estimator 704 and a quick paging signal detector 705. As depicted in FIG. 7, the receiving node 700 operates under the control of a suitably programmed controller 706. OFDMA symbols carried by received DL signals are decoded by the controller 706 based on signals generated by the processor 703 and on channel estimates generated by the estimator 704. As described above, the channel estimates can be generated based on the preamble symbol(s) and/or additional pilot symbols. The controller 706 typically provides the decoded symbols to further processing in the node 700, and determines whether the SS needs to wake up in a subsequent frame to read a conventional paging signal.

The detector 705, which can be a correlator, detects the presence in received DL signals of quick paging code words associated with the node 700. As described above, the receiving node 700 can determine whether it has received its corresponding quick paging code word by correlating its received signal against the set of quick paging code words that correspond to the node 700. The controller is suitably programmed to compute correlation metrics for the quick paging code words corresponding to its PG based on signals from the detector 705. The controller 706 determines which quick paging code word was transmitted based on the difference between the metrics.

This invention provides a quick paging mechanism that does not use any additional resources that are used for data. In addition, the quick paging mechanism does not rely on either the BS TTG or on the BS RTG, thereby avoiding any problems with co-existence and interference issues.

It will be appreciated that procedures described above are carried out repetitively as necessary, for example, to respond to the time-varying nature of communication signals exchanged by transmitters and receivers. Descriptions and examples of principles, aspects, and embodiments of this invention are intended to encompass both structural and functional equivalents, and it is intended that such equivalents include both currently known functional equivalents as well as functional equivalents developed in the future, regardless of structure. The artisan will also appreciate that block diagrams can represent conceptual views of illustrative circuitry embodying the principles of the technology and that flow charts, state transition diagrams, pseudocode, and the like represent processes which may be substantially represented in a computer readable medium and so executed by a computer or programmable processor, whether or not such computer or processor is explicitly shown.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method of quick paging in a communication system using a plurality of subcarriers for orthogonal frequency division multiple access, wherein a preamble signal comprises one or more preamble sequences, at least one predetermined preamble sequence being successively transmitted on a predetermined first set of the subcarriers, the method comprising:

receiving, at a base station, a request to page one or more subscriber stations believed to be in a paging area that includes the base station;

identifying, by the base station, at least one quick paging code word that corresponds to the one or more subscriber stations;

transmitting the at least one quick paging code word on a second set of subcarriers;

wherein the second set includes only subcarriers that were not previously used in the preamble signal, and the quick paging code word and the at least one predetermined preamble sequence are transmitted simultaneously in the preamble signal.

2. The method of claim 1, wherein the at least one quick paging code word includes at least one preamble sequence that is unused in the communication system.

3. The method of claim 1, wherein a quick paging code word comprises a combination of two preamble sequences that are unused in the communication system.

4. The method of claim 1, wherein the second set of subcarriers is transmitted at a power level that is lower than a power level of the first set of subcarriers.

5. The method of claim 1, wherein quick paging code words are mutually orthogonal sequences.

6. The method of claim 5, wherein the at least one quick paging code word is masked by a pseudorandom-noise sequence.

7. The method of claim 1, wherein transmitting a first quick paging code word indicates that a paging signal will be subsequently transmitted and transmitting a second quick paging code word indicates that the paging signal will not be subsequently transmitted.

8. The method of claim 1, further comprising transmitting pilot symbols having known symbol values over a third set of subcarriers that does not include subcarriers in any of the first set and the second set.

9. A method in a subscriber station of quick paging in a communication system using a plurality of subcarriers for orthogonal frequency division multiple access, the method comprising:
  receiving, at a subscriber station, quick paging setup information from a base station, wherein the quick paging setup information informs the subscriber station of one or more paging code words to listen for;
  receiving a predetermined preamble signal that can include at least one predetermined quick paging code word carried by a second set of subcarriers, wherein the second set of subcarriers is different from a first set of subcarriers that carry the predetermined preamble sequence; and
  determining whether a respective quick paging code word is present in the received preamble signal.

10. The method of claim 9, further comprising, if the respective quick paging code word is determined to be present in the received signal, receiving a subsequent paging signal.

11. The method of claim 9, further comprising, if the respective quick paging signal is determined to be not present in the received signal, going into a sleep mode.

12. The method of claim 9, wherein the at least one predetermined quick paging code word includes at least one of a Walsh-Hadamard sequence and a predetermined preamble sequence that is different from preamble sequences carried by the first set of subcarriers.

13. The method of claim 9, wherein determining whether a respective quick paging code is present includes estimating communication channel characteristics based on a received predetermined preamble signal carried by the first set of subcarriers.

14. The method of claim 13, wherein the signal received further includes pilot symbols having known symbol values over a third set of subcarriers that does not include subcarriers in any of the first and second sets, and communication channel characteristics are estimated based on the pilot symbols.

15. A transmitter for sending quick paging signals in a communication system using a plurality of subcarriers for orthogonal frequency division multiple access, wherein a preamble signal comprises one or more preamble sequences, at least one predetermined preamble sequence being successively sent on a predetermined first set of the subcarriers, the transmitter comprising:
  a memory configured to store associations between quick paging code words and receivers in the communication system;
  a control processor configured to exchange information with the memory; and
  a quick paging code word generator configured to use information from the control processor to generate selected quick paging code words to be sent to an associated receiver on a second set of subcarriers;
  wherein the second set includes only subcarriers that were not previously used in the preamble signal, and the quick paging code word and the preamble sequence are sent simultaneously in the preamble signal.

16. The transmitter of claim 15, wherein the at least one quick paging code word includes at least one preamble sequence that is unused in the communication system.

17. The transmitter of claim 15, wherein a quick paging code word comprises a combination of two preamble sequences that are unused in the communication system.

18. The transmitter of claim 15, wherein the second set of subcarriers is sent at a power level that is lower than a power level of the first set of subcarriers.

19. The transmitter of claim 15, wherein quick paging code words are mutually orthogonal sequences.

20. The transmitter of claim 15, wherein the quick paging code word generator is configured to mask the at least one quick paging code word by a pseudorandom-noise sequence.

21. The transmitter of claim 15, wherein the control processor is further configured to generate pilot symbols having known symbol values to be sent over a third set of subcarriers that does not include subcarriers in any of the first set and the second set.

22. A receiver for receiving quick paging signals in a communication system using a plurality of subcarriers for orthogonal frequency division multiple (OFDM) access, wherein a preamble signal comprises one or more preamble sequences, at least one predetermined preamble sequence being successively sent on a predetermined first set of the subcarriers, comprising:
  an OFDM demodulator;
  a channel estimator in communication with the OFDM demodulator;
  a quick paging signal detector in communication with the OFDM demodulator and the channel estimator; and
  a controller configured to control the OFDM modulator, channel estimator, and quick paging signal detector;
  wherein the quick paging signal detector detects presence in a received preamble signal of a quick paging code word associated with the receiver on a second set of the plurality of subcarriers;
  wherein the second set includes only subcarriers that were not previously used in the preamble signal; and
  wherein the quick paging code word and the preamble sequence are sent simultaneously in the preamble signal.

23. The receiver of claim 22, wherein OFDM symbols carried by received signals are decoded by the controller based on signals generated by the OFDM modulator and on estimates of characteristics of the communication channel generated by the channel estimator.

24. The receiver of claim 23, wherein the estimates are based on at least one of a received preamble sequence and an additional pilot symbol; and the additional pilot symbol is received over a third set of subcarriers that does not include subcarriers in any of the first set and the second set.

25. The receiver of claim 22, wherein the controller is configured to determine whether the receiver needs to wake up to read a conventional paging signal based on whether a quick paging code word is detected as present in a received signal.

* * * * *